United States Patent
Gosnell et al.

[15] 3,675,572
[45] July 11, 1972

[54] GRAVURE PRINTING PLATE MAKING PROCESS

[72] Inventors: Earl J. Gosnell, Rochester; Jerry H. Taylor, Webster, both of N.Y.

[73] Assignee: Burroughs Corporation, Detroit, Mich.

[22] Filed: Dec. 21, 1970

[21] Appl. No.: 100,411

Related U.S. Application Data

[63] Continuation-in-part of Ser. No. 791,115, Jan. 14, 1969, abandoned.

[52] U.S. Cl..........................101/401.1, 101/395, 250/65 T, 264/25, 264/327
[51] Int. Cl. ......................................................B41c, B41n
[58] Field of Search..................101/401.1, 401.2; 250/65 T; 264/25, 327

[56] References Cited

UNITED STATES PATENTS

| | | | |
|---|---|---|---|
| 2,616,961 | 11/1952 | Groak | 250/65 T X |
| 2,808,777 | 10/1957 | Roshkind | 250/65 T X |
| 2,825,282 | 4/1958 | Gergen et al | 101/401.1 X |
| 3,111,584 | 11/1963 | Appledorn | 250/65 T |

*Primary Examiner*—David Klein
*Attorney*—Kenneth L. Miller and Kevin R. Peterson

[57] ABSTRACT

A method for quickly making an intaglio or gravure printing plate through the use of near infrared irradiation. A pattern of protuberances or grooves is formed on a surface of near infrared transparent, moldable plastic, glass, or quartz which is not deformable at the temperature used in practicing the invention. This gravure matrix can be in the form of a sheet, endless belt, or plate. The information to be reproduced can be printed, written, or drawn in highly near infrared absorbing material on a copy sheet, which can be of paper, for example, or other substantially infrared transparent or reflective material. The copy sheet is assembled with the infrared absorbing material in contact with a base plate sheet of transparent, unoriented, near infrared non-absorbing plastic, which in turn is placed on the gravure matrix. Under uniform pressure of 5 to 50 p.s.i. the assembly is exposed briefly to near infrared energy. The base plate sheet will have formed therein an exact reproduction of the copy material in the form of a multiplicity of cells or grooves. This gravure printing plate can then be mounted according to known procedures on an offset gravure printing device.

6 Claims, 4 Drawing Figures

PATENTED JUL 11 1972 3,675,572

INVENTORS.
EARL J. GOSNELL
JERRY H. TAYLOR
BY
Charles S. Hall
ATTORNEY

GRAVURE PRINTING PLATE MAKING PROCESS

CROSS REFERENCE TO RELATED APPLICATION

This application is a continuation in part of application, Ser. No. 791,115, filed Jan. 14, 1969, now abandoned.

BACKGROUND OF THE INVENTION

Printing plates made from plastic materials have been used by the printing industry for many years (See "Rubber and Plastics Used in the Printing Industry" published by the "Research and Engineering Council of the Graphic Arts Industry, Inc.," Washington, D. C., 1953). As early as 1911 a patent was issued on a thermosetting printing plate made with a phenol-formaldehyde resin molding compound.

In the 1940's thermoplastics were introduced which simplified some mechanical problems in engraving and electrotyping but the basic procedures were substantially unchanged. Later, plastic molding procedures were developed using a rigid sheet of thermoplastic vinyl. A vinyl electrotype mold, from which a number of electrotype shells could be made, was produced under pressures of 400 p.s.i. on a heated original subject.

Phenolic thermosetting plastic has been molded into matrices under pressure from raised type metal engravings and electrotypes. These molded matrices must be cured at elevated temperatures for a number of minutes.

The molds formed using these and similar methods and materials are but the matrices from which thermoplastic plates may be made as a reproduction of the original subject. These processes have all also been very time consuming and exacting.

More recently a photopolymer printing plate has been introduced utilizing a plastic material which hardens on exposure to light. After the material is exposed to light through a photographic negative, the unexposed plastic is removed by a spray of weak caustic soda.

All of these procedures require highly trained technicians. Some require the use of chemicals and many require heavy hydraulic presses. None of these processes is adaptable for use in the ordinary business office for the rapid production of a relatively large number of copies.

The preparation of a copper gravure plate, as commonly used in gravure or intaglio printing is a particularly technical and expensive process and is not feasible for production of short run editions.

To prepare a gravure plate of the desired screen cell and cell wall width and cell depth in the conventional method on copper, a transparent photographic positive is printed on a sensitized sheet of special tissue coated with bichromatized gelatin. The exposed tissue is superimposed on the copper plate, and after soaking in water for a few minutes the paper is removed leaving the gelatin image on the copper. The soluble portions of the gelatin, that were not acted on by light, are washed away, and the plate is allowed to dry. When dry the portions of the plate which are not to print are painted over with a resist and the plate is then etched in a ferric chloride solution for the time required to obtain the desired cell depth. The plate is then flash chromed and is ready for use. This complete process must be repeated each time a duplicate plate is needed.

It is, therefore, the principal object of this invention to provide a method and materials for producing in a few seconds a cellular intaglio or gravure printing plate utilizing near infrared absorbent copy, such as carbon blacks or iron oxides, on paper, for example, as the original subject.

SUMMARY OF THE INVENTION

An improvement in the method and materials for producing a gravure printing plate wherein a gravure matrix is prepared by forming an overall pattern of protuberances or grooves in a surface of a sheet or belt of near infrared transparent, moldable and heat-resistant plastic or glass or quartz, and the gravure printing plate is made from a sheet of substantially near infrared transparent, unoriented plastic. The unoriented plastic sheet is assembled on the matrix and the original copy, in the form of near infrared absorbent indicia on a substantially near infrared reflective or transparent sheet, is placed with the indicia in intimate contact with the unoriented plastic. While under uniform pressure of 5 to 50 p.s.i. the manifolded assembly is irradiated with near infrared energy for 0.2 to 1 second. Upon separation of the sheets, the gravure printing plate will contain cells to the depth of the relief pattern on the matrix, usually 10 to 50 microns, in the exact pattern of the graphic information of the original copy. The resolution of the pattern on the printing plate is a function of the density of protuberances or grooves on the gravure matrix which may vary from 3,000 to 125,000 per square inch for the protuberances, and from 55 to 350 per linear inch for the grooves.

BRIEF DESCRIPTION OF THE DRAWINGS

FIG. 1a is an enlarged view of a small portion of the upper surface of the gravure matrix.

FIG. 4a is a greatly enlarged view of a small portion of the gravure matrix surface of the transport belt.

DETAILED DESCRIPTION

Figure 1:
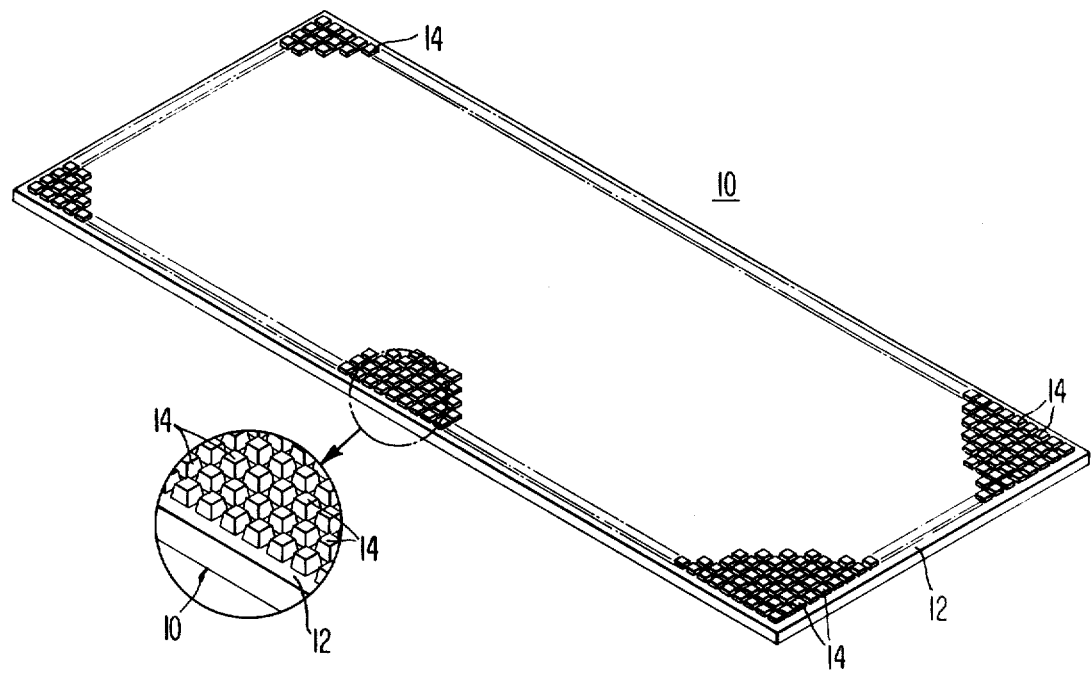
FIG. 1 is a perspective view of the gravure matrix of Applicants' invention showing a portion of the protuberances.

Applicants' gravure matrix, as illustrated in FIG. 1, numbered generally as 10, can be formed on a sheet or endless belt of near infrared transparent, moldable, and heat-resistant plastic, or on a glass or quartz plate. The term heat-resistant is used to indicate that the gravure matrix is not thermally deformable at the temperatures used in practicing this invention. As a sheet of plastic the gravure matrix can range in thickness from 0.005 inch to about 0.20 inch. If the gravure matrix utilizes an endless belt of plastic the web should be of a thickness of between 0.005 inch to about 0.015 inch.

In the sheet or endless belt form, the gravure matrix can be made from chlorotrifluoroethylene polymer,
polytetrafluoroethylene,
polyvinyl fluoride,
polyvinylidene fluoride,
tetrafluoroethylene/hexafluoropropene copolymer,
tetrafluoroethylene/vinylidene fluoride copolymer, and
trifluorochloroethylene/vinylidene fluoride copolymer.

Applicants prefer chlorotrifluoroethylene polymer or polytetrafluoroethylene.

Heat-resisting borosilicate glasses (for example Corning Vycor) or quartz can be used in gravure matrix plates in thickness up to about 0.25 inch but 0.10 inch is preferred.

Although the preferred materials for the gravure matrix are stated, it is apparent that there can be other materials presently in existence or developed in the future which can be processed by compression molding, casting, etching, engraving or embossing or other suitable processes to form a gravure matrix having on at least one surface a pattern of raised and depressed areas.

A matrix of protuberances 14 is formed on the surface 12 of the sheet or web 10, by any suitable method. If the matrix is to be formed on a plastic sheet or web, the matrix can be impressed by compression molding through commercially available equipment. Such a matrix can also be formed in the web or sheet when the web or sheet is originally manufactured.

Methods of casting or etching a surface of glass plate or etching a quartz plate to form a matrix of protuberances have been well known in that art for many years.

The protuberances of the relief form matrix can have a depth of 10 to 50 microns with a preferred depth of 15 to 30 microns. The number of protuberances can range from about 3,000 to about 125,000 per square inch, corresponding to 55–350 line screens, or higher, as desired. The quality of reproduction from the finished gravure printing plate will be a function of the density of the protuberances, as well as other factors in processing the plate and the types of inks used.

The tiny embossments 14 are illustrated as a matrix, columns and rows, of truncated pyramids. However, the individual bosses can be in any convenient form such as pyramids, truncated cones, or micro columns with variously shaped perimeters, for example. Neither is it necessary that the embossments be in individual bosses nor in perpendicular columns and rows. It may be desired to style the reproduction by using grooves, 55–350 grooves per linear inch, in a regular helix or other pattern. The individual bosses can also be arranged in various patterns for printing effects.

The purpose of the gravure matrix plate 10 is to impress the gravure printing plate with the pattern of the original copy, as hereinafter described.

Figure 2:
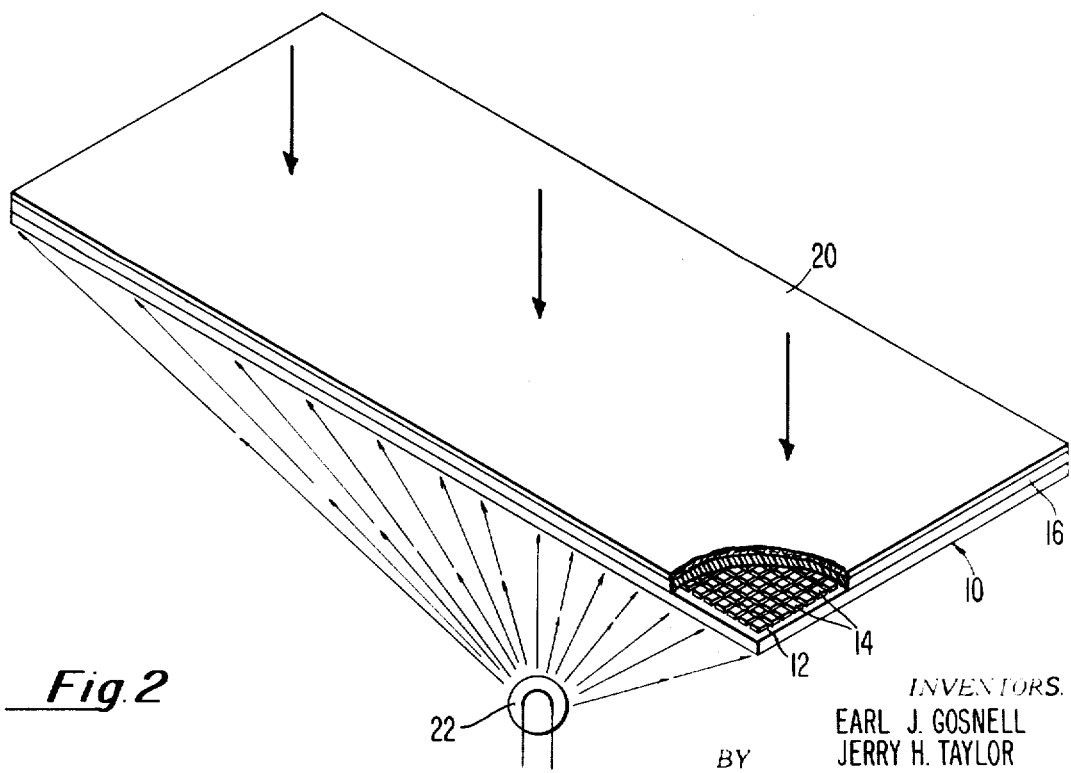
FIG. 2 is a schematic illustration, partly broken away, of the sub-assembly of the gravure matrix and base plate sheet shown manifolded with an original copy under uniform pressure and near infrared irradiation.
Figure 3:
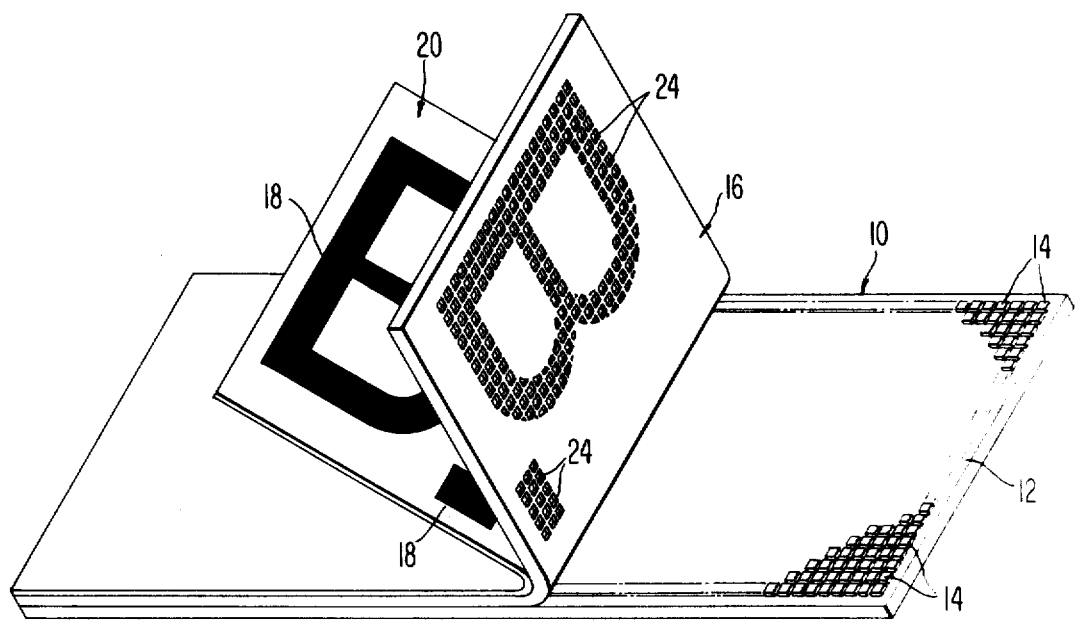
FIG. 3 is a perspective view of a portion of the completed gravure printing plate partially separated from the original copy and gravure matrix.

The gravure printing plate is made from a base plate 16, FIGS. 2 and 3, which is a sheet of substantially near infrared transparent, dimensionally stable, unoriented plastic. The base plate should have a thickness of at least 0.003 inch. Preferably, sheet materials having a thickness in the range of about from 0.005 to about 0.040 inch will be employed. Through the use of the gravure matrix 10, according to the teaching of the present invention, a surface of the base plate 16 will be impressed with gravure cells of from 10 to 50 microns in depth and from 3,000 to about 125,000 per square inch. The gravure cells will be in a pattern corresponding to the character to be printed.

The base plate is preferably composed of medium density polyethylene, Sp. Gr. 0.926–0.940, an ionomer resin such as Du Pont's Surlyn 1601 or 1650, the polyallomers, or polypropylene. The base plate can also be made from ethylene vinyl or ethylene acrylic copolymer, a polybutylene, or an ethylene butylene copolymer.

The ionomer resins are copolymers of ethylene and a vinyl monomer with an acid group such as methacrylic acid. They are cross-linked polymers in which the linkages are ionic as well as covalent. The resins are near infrared transparent, resilient and thermoplastic. The polyallomer resins are copolymers of propylene and ethylene which have the highly ordered crystalline structure of polypropylene but differ chemically because of the incorporation of ethylene into the molecule. These resins are also near infrared transparent and thermoplastic.

In the selection of plastic materials for use in the gravure matrix 10 and the plastic base plate 16 both the near infrared transmission and the thermal properties of the materials must be taken into consideration. In carrying out the preparation of a gravure printing plate according to the present invention, the base plate 16 is thermally deformed about the protuberances or grooves on the surface of the gravure matrix. There must be a sufficient difference in the thermal properties of the plastic materials so that the gravure matrix will maintain its dimensional integrity and surface configuration while the plastic forming the gravure printing plate softens and is forced to conform to the surface pattern of the gravure matrix. The material selected for use in the preparation of the gravure matrix and the gravure printing plate should preferably have a difference in thermal properties of 100° to 300° F. For example, the ionomer resins have a resistance to heat of 140° to 160° F. while polytetrafluoroethylene has a resistance to heat of 500° F. The heat resistance of the materials are reported in Modern Plastics Encyclopedia and were determined according to ASTM Test D 759–48.

The original copy to be reproduced can be any graphic information drawn, typed, inscribed or otherwise deposited in near infrared absorbent material 18 on a substantially near infrared transparent or reflective sheet 20, such as paper. The near infrared absorbent material can be, for example, a carbon black, an iron oxide, a cobaltic oxide, manganese dioxide, or cupric oxide. Carbon black and iron oxide commonly appear in inks, and paper and ribbons coated or impregnated with such inks. Additionally, graphite is an excellent material for this purpose.

Referring now to FIG. 2 for a description of the preparation of a gravure printing plate according to the invention, the subassembly formed by the gravure matrix 10 and plastic base sheet 16 is positioned over a source of high intensity, near infrared radiation 22, with the gravure pattern up, i.e., away from the source of near infrared energy. The base plate sheet is in direct contact with the gravure matrix and the original copy subject is positioned with copy to be reproduced juxtaposed to the base plate. A uniform pressure of 5 to 50 p.s.i. can be applied to the manifolded assembly of sheets while it is being irradiated briefly with high intensity near infrared energy, though a range of 10 to 20 p.s.i. is preferred. The exposure time can be from 0.05 to 2 seconds.

In the near infrared exposure step of the process of the present invention, the assembly of the gravure matrix, printing plate and original indicia bearing sheet are exposed to a moving high energy source of near infrared radiation or the printing plate and original sheet are moved past a near infrared source while the plate is in contact with a gravure matrix in the form of a belt. In either process only a portion of the plate is exposed to the near infrared radiation at any one time while the plate and near infrared source move relative to one another. The actual exposure time for each portion of the plate is of the order of 0.05 to 2 seconds. Obviously, if a near infrared source of sufficient intensity were available to expose the entire plate at one time then there would be no necessity for moving the plate or source. At the present time the complete exposure of the printing plate at one time is impractical on an office size apparatus.

Radiant energy capable of the phenomenon of heat generation upon absorption in the materials comprising the representations placed on the original copy can be derived from the light sources rich in near infrared which includes sources producing rays having a wave length in the range of from about 7,500 to 30,000 angstroms. These are above the visible range but below the far infrared range. Radiant energy capable of the phenomenon of the type described may be found in the rays of the sun and therefore exists in ordinary daylight. However, they can be developed in high concentration by infrared sources such as a tungsten filament in a glass bulb or quartz tube operating at 3,000° to 4,000° F. Most advantageously, an infrared source producing radiation in the range of from about 10,000 to 20,000 angstroms will be utilized. The amount of heat developed depends chiefly upon the duration of exposure and the intensity of the usable radiant energy of the infrared emitting source.

A high intensity source of near infrared radiation is preferred in order to reduce exposure time to a minimum. Quartz tube, tungsten filament, lamps, for example, the General Electric T-2 ½ and T-3, can be operated to produce a broad range of infrared concentration from 100 watts to over 600 watts per linear inch with the near infrared concentration increasing and finally shifting into the visible spectrum with increasing supply voltage. It has been found that overvoltage should be used with any given lamp sufficient to produce a filament temperature of between 2,400° to 2,800° K. Each of the aforementioned units employs a quartz tube, tungsten filament lamp with voltage boosted above line to increase energy output.

The original copy sheet 20 and gravure printing plate 16 are then separated from the gravure matrix 10 as shown in FIG. 3. The printing plate will be found to contain a multiplicity of cells 24 in the exact configuration of the graphic information 18 on the copy sheet 20. On microscopic examination, the visible reproduction has been found to be caused by plastic flow under pressure resulting in surface deformation conforming to the surface contours of the gravure matrix against which the base plate sheet was compressed while being irradiated.

The cells 24 provide a gravure or intaglio surface for a printing plate which can be mounted on an appropriate printing device for use with any color ink desired.

The gravure matrix sheet, belt or plate 10, as preferred, will not ordinarily be damaged in the process of preparing a printing plate and, therefore, can be used over and over.

Figure 4:
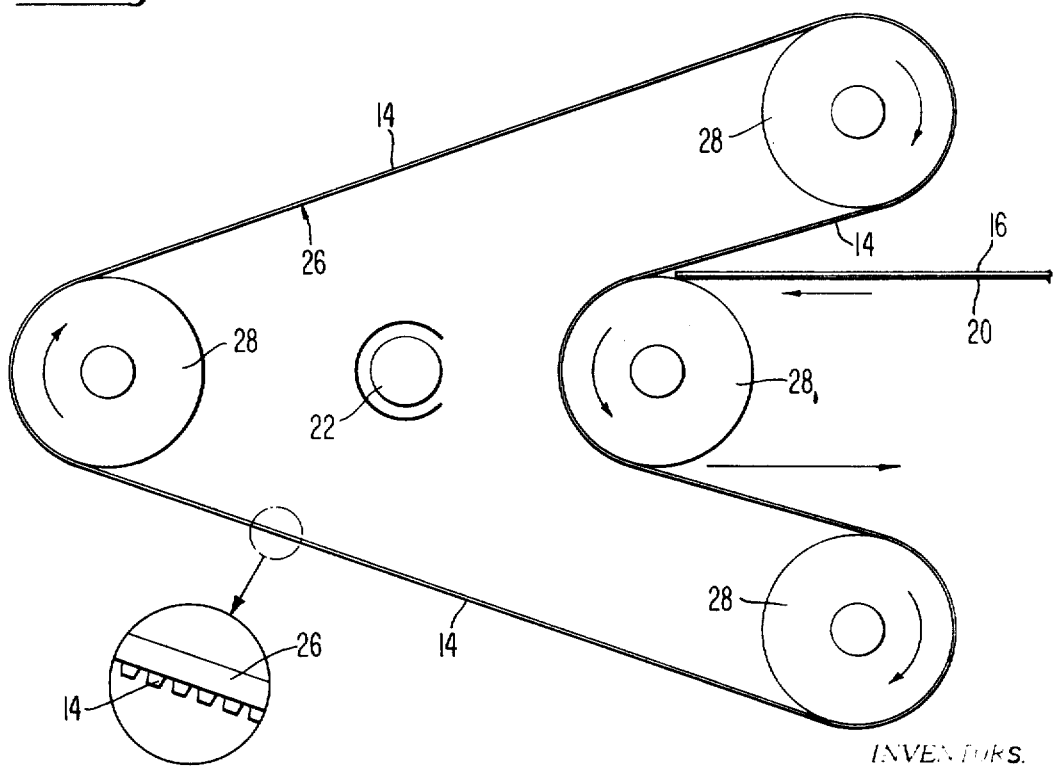
FIG. 4 is a schematic illustration of Applicants' gravure matrix in the form of a transport belt in a thermographic copying machine.

In FIG. 4 Applicants' gravure matrix is shown schematically in the embodiment of an endless transport belt 25 having throughout the length of its outer surface a pattern of protuberances 14 as shown in FIGS. 1 through 3. The belt 26 passes over the surface of the drive drums 28 of a thermographic copying machine in the direction of the arrows as shown in the drawing in the known manner.

A source of near infrared radiation 22 is positioned to irradiate the gravure printing plate 16 and copy-bearing sheet 20 through the belt 26 as they are carried between the belt and drum 28.

In the arrangement of the drums 28 and belt 26 as shown the gravure matrix of tiny embossments on the surface of the belt is outward from the drums except for drum 30 juxtaposed to the irradiation source 22. The copy-bearing sheet 20 and gravure printing plate 16 are assembled with the infrared absorbent material 18 facing the printing plate 16 and fed between the gravure matrix belt 26 and the drum 30 with the plate 16 against the array of protuberances of the gravure belt. The tension of the belt 26 provides the required uniform pressure against the assembled plate 16 and copy sheet 20 and drum 30 as the assembly is irradiated by the near infrared source 22.

A gravure printing plate is prepared under Applicants' invention in the few seconds required to produce a thermographic copy in an office copying machine. The copy sheet 20 merely has to be peeled away from the gravure printing plate 16.

As a belt the gravure matrix may be utilized in thermographic copying devices which are designed to use a plastic belt for copy transport. Such a copier is sold by Minnesota Mining and Manufacturing Company under the trade name of "Thermo Fax." As a plastic sheet or as a glass or quartz plate, the gravure matrix may be used with a thermographic copier of the type made by the Ditto Division of Bell and Howell Company under the name "Masterfax."

In preparing a gravure printing plate in accordance with the teaching of the present invention, a sheet of thermally deformable plastic, for example an ionomer resin film such as Surlyn 1601, is placed in surface contact with the gravure matrix. As previously pointed out, the ionomer resin film has a heat resistance up to 140° to 160° F. The gravure matrix can be polytetrafluoroethylene which has a heat resistance of 500° F. The selection of these materials provides a substantial difference in thermal properties so that the plastic printing plate can thermally form about the gravure matrix without distorting the matrix.

The sub-assembly of the gravure matrix and plastic plate is then manifolded with an original sheet containing indicia capable of absorbing near infrared energy. The near infrared absorbing indicia should be in contact with the plastic plate. The combination of the sub-assembly and the original sheet is then exposed to a source of near infrared radiation which causes the indicia on the original sheet to heat to a temperature above the softening range of the plastic forming the printing plate. The exact temperature that the near infrared absorbing indicia is heated to cannot be defined precisely since it depends on factors such as the shape of the indicia, the amount of absorbent material present, the degree of embossment or thermal contact between the indicia and the substrate, and the proximity of other heat absorbing indicia. An exposure time of between 0.05 to 2 seconds is sufficient to cause the indicia to soften the plastic printing plate and allow it to flow under pressure while producing no deleterious heating effects on the gravure matrix.

Following exposure the printing plate can be stripped from the gravure matrix. The plastic printing plate is then ready for mounting according to known techniques in a gravure or intaglio type printing press.

Under Applicants' invention a gravure printing plate can be made under office conditions with a thermographic copying machine which, when mounted on the plate cylinder of a suitably designed offset gravure printing device, will produce at least 5,000 copies at web or sheet speeds of up to 1,000 feet per minute.

While a particular embodiment of the invention has been shown, it will be understood, of course, that it is not desired that the invention be limited thereto since modifications may be made, and it is, therefore, contemplated by the appended claims to cover any such modifications as fall within the true spirit and scope of the invention.

We claim:

1. A method for preparing a gravure printing plate comprising the steps of:
   forming on a length of near and medium infrared transparent and heat-resistant material a gravure matrix comprising a pattern of raised areas,
   providing a printing plate base comprising a sheet of substantially near infrared transparent, dimensionally stable, unoriented thermoplastic,
   providing graphic information in the form of highly near infrared absorbent material on a substantially near infrared non-absorbent copy sheet,
   assembling said printing plate base, said gravure matrix and said copy sheet with the near infrared absorbent material on said copy sheet in intimate contact with said printing plate base,
   irradiating said assembly with high intensity near infrared energy through said gravure matrix toward said infrared absorbent material while subjecting said assembly to a uniform pressure of 5 to 50 pounds per square inch,
   separating said printing plate from said gravure matrix to provide a gravure printing plate having a pattern of depressed areas in the configuration of the graphic information on the copy sheet.

2. A method of preparing a gravure printing plate as set forth in claim 1 wherein the pattern of raised areas is formed with a density of 3,000 to 125,000 per square inch and with a depth of 10 to 50 microns.

3. A method of preparing a gravure printing plate as set forth in claim 1 wherein the pattern of raised areas is formed by grooves with a density of 55 to 350 per linear inch and with a depth of 10 to 50 microns.

4. A method for preparing a gravure printing plate comprising the steps of:
   providing a gravure matrix comprising a length of near infrared transparent and heat-resistant material having thereon a pattern of raised areas,
   providing a printing plate base comprising a sheet of substantially near infrared transparent, dimensionally stable, unoriented thermoplastic,
   providing graphic information in the form of highly near infrared absorbent material on a substantially near infrared non-absorbent copy sheet,
   assembling said printing plate base, said gravure matrix and said copy sheet with the infrared absorbent material on said copy sheet in intimate contact with said printing plate base,
   irradiating said assembly with high intensity near infrared energy through said gravure matrix toward said infrared absorbent material while subjecting said assembly to a uniform pressure of 5 to 50 pounds per square inch,
   separating said printing plate from said gravure matrix to provide a gravure printing plate having a pattern of depressed areas in the configuration of the graphic information on the copy sheet.

5. A method for preparing a gravure printing plate as set forth in claim 4 wherein the gravure matrix has a pattern of raised areas thereon with a density of 3,000 to 125,000 per square inch and with a depth of 10 to 50 microns.

6. A method for preparing a gravure printing plate as set forth in claim 4 wherein the gravure matrix has a pattern of raised areas formed by grooves with a density of 55 to 350 per linear inch and with a depth of 10 to 50 microns.

* * * * *